United States Patent [19]

McLuckie et al.

[11] 4,145,073

[45] Mar. 20, 1979

[54] LOCKUP SYSTEM FOR A VEHICLE SUSPENSION MECHANISM

[75] Inventors: Walter L. McLuckie, Coal City; Herschel M. Williamson, Joliet, both of Ill.

[73] Assignee: Caterpillar Tractor Co., Peoria, Ill.

[21] Appl. No.: 785,626

[22] Filed: Apr. 7, 1977

[51] Int. Cl.[2] .................. B60G 3/14

[52] U.S. Cl. .................. 280/702; 280/714

[58] Field of Search .................. 280/702, 703, 706, 707, 280/714, 708, 709, 6 H; 267/65 D; 188/299, 314, 316; 212/145

[56] References Cited

U.S. PATENT DOCUMENTS

| | | | |
|---|---|---|---|
| 1,950,685 | 3/1934 | McGee | 188/299 |
| 2,977,110 | 3/1961 | Kilgore | 280/714 |
| 3,077,952 | 2/1963 | Neises | 212/145 |
| 3,090,611 | 5/1963 | Schultze | 267/11 |
| 3,250,526 | 5/1966 | Kress | 267/64 |
| 3,300,202 | 1/1967 | Vinton | 267/1 |
| 3,526,329 | 9/1970 | Anderson | 214/40 |
| 3,953,040 | 4/1976 | Unruh | 280/6 H |
| 3,963,086 | 6/1976 | Mason | 180/51 |

*Primary Examiner*—Joseph F. Peters, Jr.
*Assistant Examiner*—John A. Carroll
*Attorney, Agent, or Firm*—Charles E. Lanchantin, Jr.

[57] ABSTRACT

A lockup system for a vehicle suspension mechanism includes a frame, an axle assembly having a ground engaging wheel thereon, a radius arm pivotally connected to the frame and supporting the axle assembly and wheel, a resilient suspension device connected to the frame and one of the arm and axle assembly for cushioning oscillatory movement of the arm as the wheel traverses irregular terrain, and a lockup apparatus connected to the frame and to one of the arm and axle assembly independently of the resilient suspension device and being of a construction sufficient for maintaining a preselected length holding the arm substantially rigid or maintaining a freely telescoping length floating the arm and permitting full action of the resilient suspension device.

5 Claims, 1 Drawing Figure

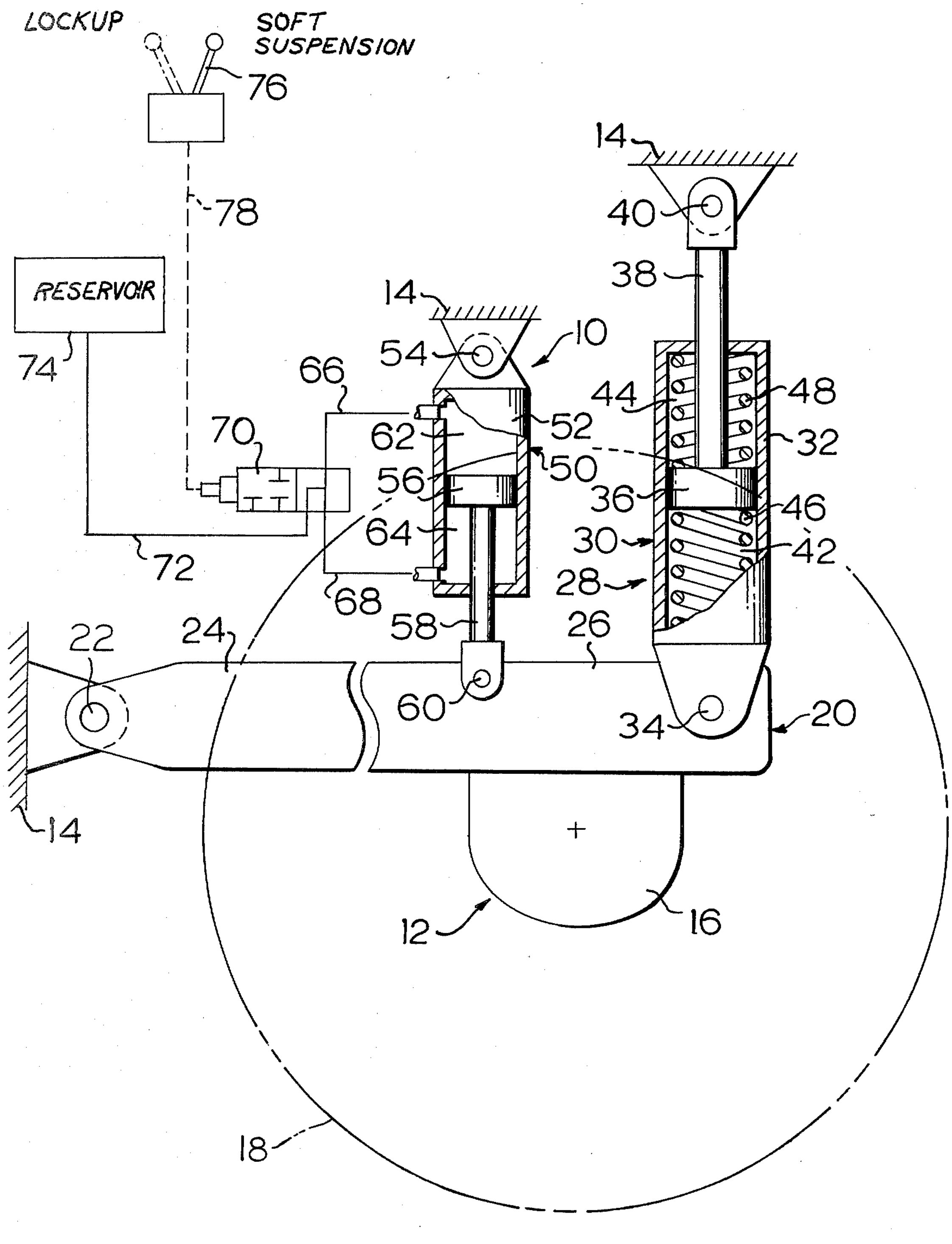
LOCKUP
SOFT SUSPENSION
76
78
RESERVOIR
74
72
70
66
68
14
54
10
62
52
56
50
64
58
60
14
40
38
44
48
32
36
46
30
42
28
26
24
22
20
34
14
12
16
18

LOCKUP SYSTEM FOR A VEHICLE SUSPENSION MECHANISM

BACKGROUND OF THE INVENTION

The present invention is related to a lockup system for a vehicle suspension mechanism, and more particularly to an independent lockup system which can selectively prevent oscillatory movement of an axle assembly and wheel.

Soft suspension of one or more axle assemblies on the vehicle frame is considered a necessity on many earthmoving vehicles. Such suspensions not only provide operator comfort, but also provide improved handling characteristics and reduce stresses in the frame when the vehicle traverses uneven surfaces. Unfortunately, the free oscillation of an axle is often undesirable during certain working conditions. For example, the stability of the vehicle during certain earthmoving operations or resistance to tipping can be substantially improved if an entirely rigid suspension system is utilized.

One known axle suspension system includes a pair of radius arms which are pivotally connected at one end to the vehicle frame and which carry the axle at the other end. A pair of cushioning struts or ride cylinders are affixed between the axle and the frame. However, it is an expensive proposition to integrate a lockup system into this form of construction. Specifically, when the struts are of the hydraulic jack type a plurality of conduits communicate with the strut from rather complex hydraulic circuitry. Such circuitry may include a source of pressurized fluid, one or more accumulators, valves, etc., so that it is complicated to provide an apparatus for locking the struts. Furthermore, compromises in construction are needed to integrate such a lockup apparatus in the circuitry with the result that the performance reliability of the suspension system could be adversely affected.

SUMMARY OF THE INVENTION

The present invention is directed to overcoming one or more of the problems as set forth above.

According to the present invention there is provided a lockup system for a vehicle suspension mechanism including a frame, an axle assembly having a wheel thereon, a radius arm pivotally connected to the frame and supporting the axle assembly, and resilient suspension means connected to the frame and one of the arm and axle assembly for cushioning movement of the arm. Particularly, the lockup system includes a lockup suspension strut having first and second reciprocally connected members defining first and second chambers, and control means therefor. The first and second members are individually connected to one of the frame and the axle assembly, and the control means communicates a fluid to and from the chambers in a first condition to allow the members to telescope with the cushioning of the resilient suspension means. In a second condition the control means blocks fluid communication to the chambers and maintains the frame and the arm in a substantially rigid holding position. Advantageously, the strut and associated control means can be economically adapted to suspension mechanisms of widely diverse forms and can be conveniently switched between its two modes of operation at the will of the vehicle operator in accordance with the working and driving conditions.

BRIEF DESCRIPTION OF THE DRAWING

The sole FIGURE is a diagrammatic side elevational view of a vehicle suspension mechanism and lockup system therefore constructed in accordance with the present invention.

DESCRIPTION OF THE INVENTION

Referring to the drawing, a lockup system 10 constructed in accordance with the present invention is shown in cooperative association with a vehicle suspension mechanism 12. The vehicle suspension mechanism includes a vehicle frame, identified generally by the reference numeral 14, an axle assembly 16 having a ground engaging wheel 18 thereon, and a radius arm 20 pivotally connected to the frame at a transverse pivot joint 22 which supports the axle assembly and the wheel. The radius arm has a proximal end 24 adjacent to pivot joint 22 and extends longitudinally in the normal direction of vehicle travel and substantially horizontally to a distal end 26. A resilient suspension means or device 28 is connected to one of the arm and the axle assembly at its lower extremity and to the frame at its upper extremity. Preferably, the device is connected to the distal end of the radius arm and to the frame.

More particularly, the resilient suspension device 28 preferably includes a substantially vertically oriented soft suspension strut 30 having a cylindrical housing 32 which is connected to the radius arm 20 at a transverse pivot joint 34. A piston 36 and an associated rod 38 are connected to the frame 14 at a pivot joint 40 and are reciprocally disposed within the housing to define therewith a head end chamber 42 and a rod end chamber 44. A first resilient spring means 46 is disposed in the head end chamber and a second resilient spring means 48 is disposed in the rod end chamber. It is thus apparent that such mechanical spring means continually biases the piston 36 to a central position within the housing. Furthermore, such spring means is soft enough to allow deflection thereof and cushioning of the oscillatory motion of the radius arm 20 in a substantially vertical longitudinal plane as the wheel 18 traverses irregular terrain.

Pursuant to the present invention the lockup system 10 can selectively disable the resilient suspension device 28. For this purpose the lockup system includes an auxiliary or independent lockout suspension strut 50 connected to one of the radius arm 20 or axle assembly 16 at its lower extremity and to the frame 14 at its upper extremity. Preferably it is connected to the radius arm in an upright or substantially vertical manner adjacent the suspension strut 30. More specifically, the lockout suspension strut 50 has a cylindrical housing 52 preferably connected to the frame 14 at a transverse pivot joint 54 and a piston 56 and associated rod 58 dispose for reciprocation within the housing. Preferably, the rod is connected to the distal end 26 of the radius arm at a transverse pivot joint 60. In this manner the piston defines with the housing an upper or head end chamber 62 and a lower rod end chamber 64.

A conduit 66 and a conduit 68 are respectively in open communication with the upper and lower chambers 62 and 64 of the lockout suspension strut 50. These conduits are also connected to a two position selector valve 70. In the first position of the selector valve shown in the drawing, the conduit 66 and 68 are interconnected to allow free fluid communication therebetween. Another conduit 72 is connected through the selector valve to the conduits 66 and 68 under these circumstances, permitting fluid flow from or to a fluid reservoir 74. Preferably, the fluid reservoir is disposed on the vehicle frame 14 at an elevation above the lockout suspension strut permitting fluid flow thereto by gravity, thus eliminating the need for a motorized source of pressurized fluid.

The selector valve 70 is selectively moved between its first and second positions by a control member 76 disposed at a remote location therefrom. A mechanical connection, identified generally by the reference numeral 78 and the broken lines in the drawing, is effective to communicate movement of such control member to the selector valve. For example, when the control member is moved from the solid line position shown, corresponding to free fluid communication between the conduit 66 and 68 as described immediately above, to the broken line position a lockup condition of the selector valve is effected. In the second or lockup position of the selector valve the conduits 66 and 68 are blocked preventing fluid exchange between the chamber 62 and 64 and any telescoping movement of the rod 58.

In operation, when the control member 76 is positioned as illustrated, any downward movement of the rod 58 and the radius arm 20 relative to the housing 52 is effective to force fluid from the chamber 64 to the upper chamber 62 via the conduit 68, the selector valve 70, and the conduit 66. Because of the decreased fluid volume of the lower chamber relative to the upper chamber as a result of the change in length of the lockout suspension strut 50, which is due to the displacement volume of the rod, additional makeup fluid is directed to the upper chamber by way of the reservoir 74, the conduit 72 and the valve. On the other hand, any upward movement of the rod relative to the frame will result in an excess portion of the fluid being returned from the upper chamber to the reservoir.

Thus, in the first position of the selector valve 70 shown, the lockout suspension strut 50 is substantially freely telescoping permitting full and effective use of the soft suspension strut 30. Under these circumstances, the soft suspension strut cushions oscillatory movement of the radius arm to provide a relatively softer ride for the vehicle operator and reduced shock loads and stresses upon the frame 14.

Upon reaching a work site however, it may be desirable to provide a more rigid connection between the frame 14 and the wheel 18. Stabilization is achieved simply and effectively by manually positioning the control member 76 to the lockup position shown in broken lines. Simultaneously therewith, the selector valve 70 is moved rightwardly when viewing the drawing to the second position blocking the conduits 66 and 68. Thus, any fluid movement between the upper and lower chamber 62 and 64 within the lockout suspension strut 50 is prevented. In essence, the independent lockout suspension strut thus becomes a rigid link of a preselected length to hold the radius arm 20 substantially rigid with respect to the frame. Accordingly, any cushioning action of the soft suspension strut 30 is prevented.

Although mechanical spring means 44 and 46 is shown within the soft suspension strut 30, it is contemplated that the lockup system 10 of the present invention is equally adaptable for cooperative association with diverse forms of soft suspension struts. For example, the fluid-containing struts disclosed in U.S. Pat. Nos. 3,250,526 issued May 10, 1966 to R. H. Kress and 3,300,202 issued Jan. 24, 1967 to D. S. Vinton may be substituted for the soft suspension strut 30 and are incorporated herein by reference as though fully set forth in detail herein. It is further contemplated that a pair of the fluid-containing struts 30 and a pair of the fluid-containing lockout suspension struts 50 may be utilized to support an axle assembly. For example, one of such struts 30 and one of such struts 50 can connect the vehicle frame to one of a pair of radius arms which move together in parallel and laterally spaced vertical planes and which arms are connected at their distal ends to the axle assembly on the opposite sides thereof. An axle assembly having such a pair of radius arms, is disclosed in U.S. Pat. No. 3,963,086 issued June 15, 1976 to J. B. Mason, which construction is also incorporated herein by reference as if fully set forth in detail herein.

Other aspects, objects and advantages of this invention can be obtained from a study of the drawing, the disclosure, and the appended claims.

The embodiments of the invention in which an exclusive property or privilege is claimed are defined as follows:

1. In a lockup system for a vehicle suspension mechanism of the type having a frame; an axle assembly having a ground engaging wheel thereon; a radius arm pivotally connected to the frame and supporting the axle assembly and wheel; and resilient suspension means connected to the frame and one of the arm and axle assembly for cushioning oscillatory movement of the arm as the wheel traverses irregular terrain; the improvement comprising:

a lockup suspension strut having first and second reciprocally connected members defining first and second chambers therebetween, said first and second members connected individually to one of the frame and the axle assembly; and control means having a first condition for communicating a fluid to and from said chambers for telescoping said first and second members simultaneously with the independent cushioning action of said resilient suspension means, and having a second condition for blocking fluid communication to said chambers and maintaining a substantially rigid holding position of the frame and the arm.

2. The lockup system of claim 1 wherein said control means includes a pair of conduits communicating with said first and second chambers, and valve means for freely transferring a fluid therebetween in said first condition and for blocking said conduits in said second condition.

3. The lockup system of claim 2 wherein said control means includes source of fluid and a conduit communicating said source of fluid to said valve means, said source of fluid being disposed elevationally above said valve means and said lockup suspension strut.

4. The lockup system of claim 1 wherein said control means includes a pair of conduits communicating with said first and second chambers, a source of fluid, a two position selector valve connected to said pair of conduits and to said source, and means for selectively positioning said valve at said first and second positions.

5. The lockup system of claim 4 wherein said valve at said first position communicates fluid freely between said source and said pair of conduits, and at said second position blocks said conduits.

* * * * *